H. PLATT.
PLUMB RULE.
APPLICATION FILED AUG. 8, 1910. RENEWED AUG. 21, 1911.
1,004,194.
Patented Sept. 26, 1911.
3 SHEETS—SHEET 1.
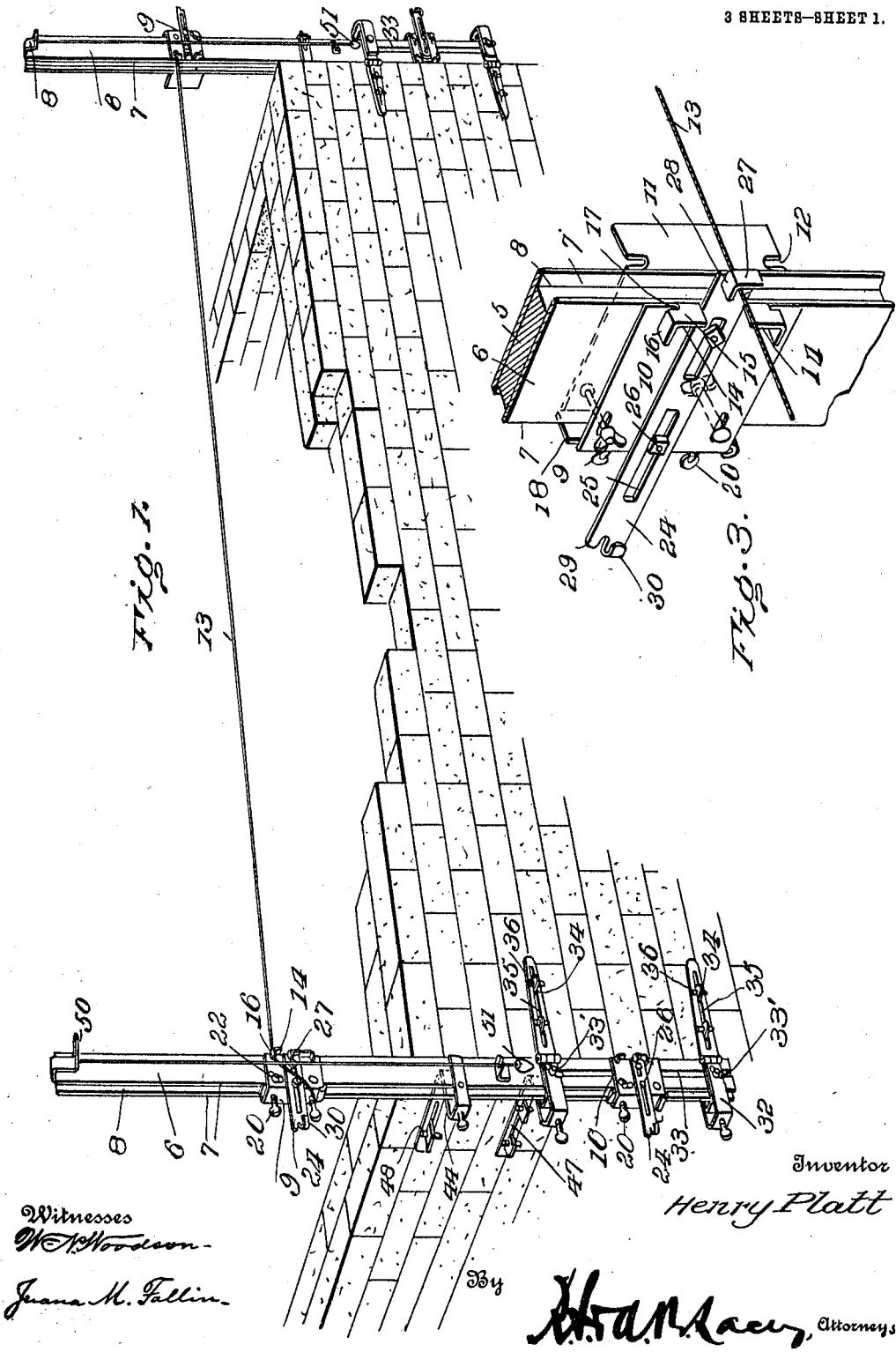

H. PLATT.
PLUMB RULE.
APPLICATION FILED AUG. 8, 1910. RENEWED AUG. 21, 1911.
1,004,194.
Patented Sept. 26, 1911.
3 SHEETS—SHEET 2.
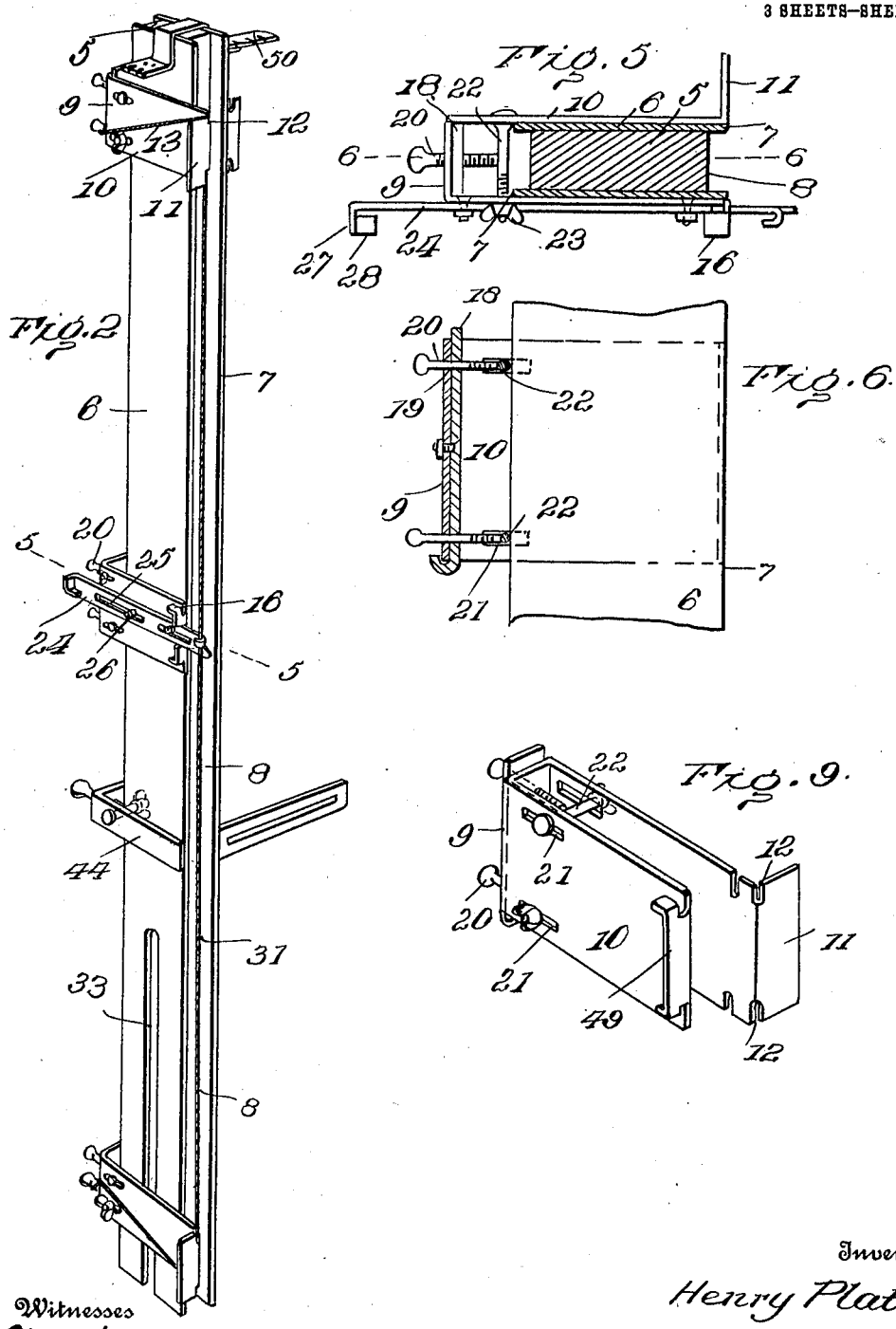

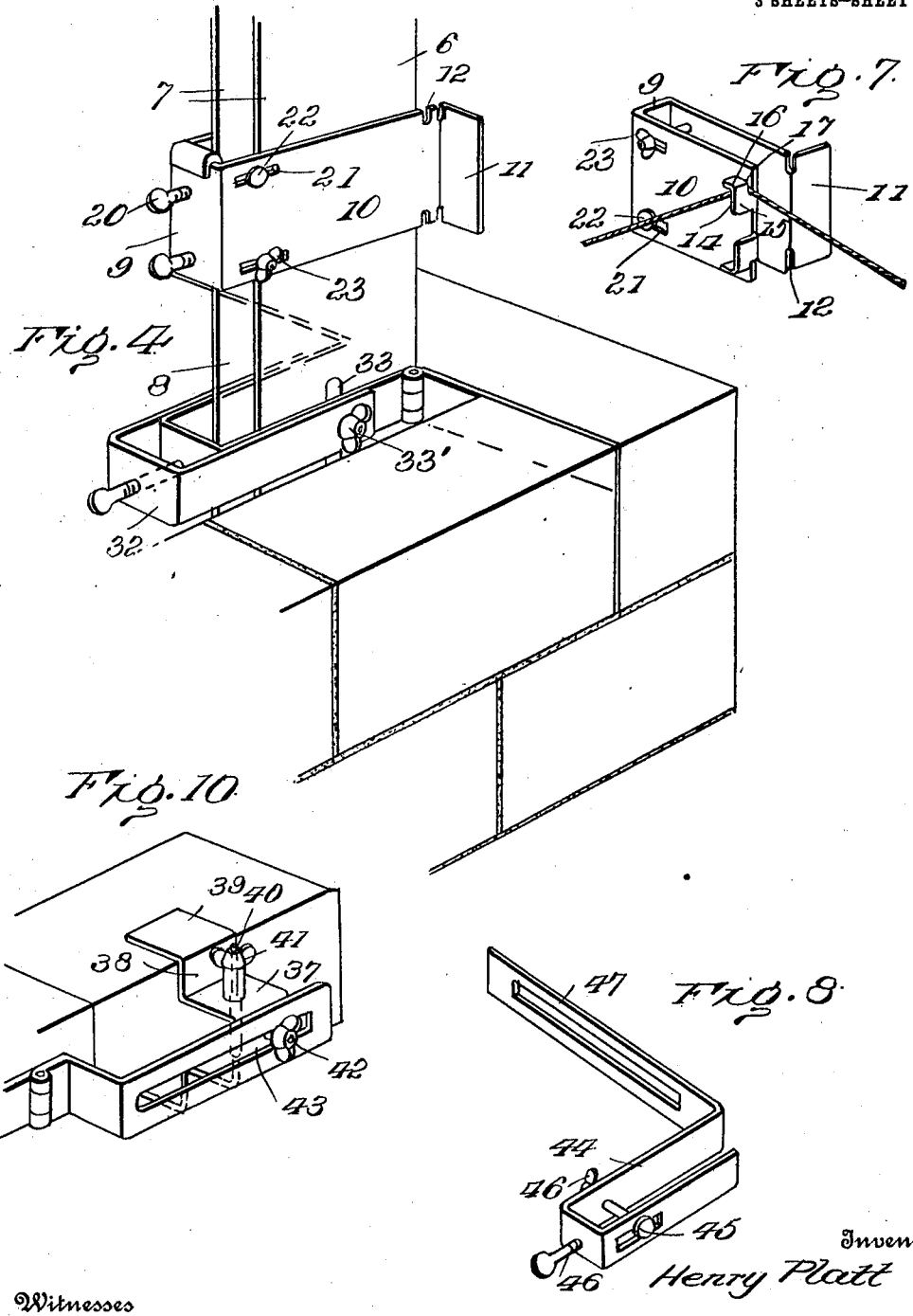

UNITED STATES PATENT OFFICE.

HENRY PLATT, OF SUFFERN, NEW YORK.

PLUMB-RULE.

1,004,194.     Specification of Letters Patent.     Patented Sept. 26, 1911.

Application filed August 8, 1910, Serial No. 576,148. Renewed August 21, 1911. Serial No. 645,314.

*To all whom it may concern:*

Be it known that I, HENRY PLATT, citizen of the United States, residing at Suffern, in the county of Rockland and State of New York, have invented certain new and useful Improvements in Plumb-Rules, of which the following is a specification.

This invention relates to plumb rules of that general class shown and described in my pending application filed in the United States Patent Office on the 8th day of June 1909, under Serial No. 501,412.

The object of the invention is generally to improve and simplify the construction of the rule and to provide the latter with oppositely disposed working faces so that the rule may be reversed and placed in position on a wall or partition with either working face thereof bearing against said wall.

A further object is to provide a plumb rule having a plurality of sliding gages detachably secured thereto and provided with spaced clamping members adapted to embrace the side walls of the rule, whereby said gages may be placed on either working face of the rule and thus permit the latter to be used for plumbing either the interior or exterior angles of a wall.

A further object is to provide one or more of the sliding gages with adjustable plates, each having means at one end thereof for supporting a horizontal line when erecting a wall with an offset or sinking and provided at its other end with means for engagement with a profile line.

A further object is to provide means for clamping the sliding gages in adjusted position on the plumb rule, and means carried by said gages for supporting a line during either horizontal or vertical trigging.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which—

Figure 1 is a perspective view of a portion of a wall, showing a pair of plumb rules constructed in accordance with my invention, in position thereon; Fig. 2 is a perspective view of one of the rules detached, showing the sliding plate reversed and in position to support a profile line; Fig. 3 is an enlarged detail perspective view, partly in section of the plumb rule with one of the sliding gages thereon, showing the sliding plate in position to hold a horizontal line when forming a wall or partition with a sinking or offset; Fig. 4 is a perspective view, showing the plumb rule supported within the angle of a wall; Fig. 5 is a transverse sectional view taken on the line 5—5 of Fig. 2; Fig. 6 is a vertical sectional view taken on the line 6—6 of Fig. 5; Fig. 7 is a perspective view of one of the sliding gages detached with the plate or trigging attachment removed, showing the manner of supporting a horizontal line at the corner of a wall; Fig. 8 is a detail perspective view of the auxiliary bracket for supporting the rule in position on a wall; Fig. 9 is a perspective view, showing a modified form of gage; Fig. 10 is a perspective view, showing a different manner of supporting one of the rule engaging brackets.

Corresponding and like parts are referred to in the following description and indicated in all the views of the drawings by the same reference characters.

The improved plumb rule forming the subject matter of the present invention comprises a longitudinally disposed body portion 5 having flat metallic plates 6 secured to the opposite side faces thereof, the edges 7 of which constitute working faces for contact with the interior or exterior surface of a wall, partition or other structure. The opposite longitudinal edges of the plates 6 are extended laterally beyond the adjacent edge of the body portion 5 to form vertically disposed mortar receiving recesses or grooves 8, preferably extending the entire height of the rule. The grooves 8 are designed to receive the mortar that exudes from the joints between the bricks of the several courses, when said bricks are struck with a hammer or trowel to make the joint of the proper thickness during the erection of a wall. The grooves 8 thus serve to receive the surplus mortar, thereby preventing said mortar from forcing the working face of the plumb rule away from the bricks and consequently permitting the rule to bear flat against the face of a wall at all times. After one or two courses of a wall are laid the bricklayer inserts his two-foot rule or other suitable tool within the groove 8 and forces said tool downwardly, thus dislodging the partially dry mortar from the groove at the joints of the bricks, which dislodging mortar drops through the groove to the ground. The working faces of the rule may also be moved out of contact with the wall to permit the mortar at the joints to be pointed up by releasing the screws 20 and 23 and pressing the rule laterally within the gages, as will be readily understood.

Slidably mounted on the plumb rule are a plurality of gages, each comprising a substantially U-shaped body portion 9, the arms 10 of which are adapted to embrace and frictionally engage the side plates 6, said gages being reversible and each open at one end thereof so that the gages may be positioned on either working edge of the rule, thus to permit the latter to be used in the formation of either an interior or exterior angle of a wall or partition. The metal constituting one arm 10 of each gage is bent laterally to produce an angularly disposed plate 11 adapted to bear against the inner faces of the bricks when forming an interior angle, each plate 11 being provided with oppositely disposed recesses or notches 12 for the reception of a line 13, as best shown in Fig. 2. The metal forming the opposite arm of each gage is bent laterally to produce spaced vertically disposed ears 14 having flat contact faces 15 for engagement with a wall and provided with laterally extending lips 16, said lips being spaced from the adjacent arms 10 of the gage to form a notch or recess 17 for the reception of the line 13 when trigging horizontally, as best shown in Fig. 7 of the drawings.

The closed end of each sliding gage 9 is reinforced by a vertically disposed plate 18 which bears against the interior wall thereof with its lower end bent laterally and upwardly in contact with the exterior wall of the gage, said reinforcing plate and end wall being pierced by spaced openings 19 for the reception of clamping devices, the latter being preferably in the form of screws or bolts 20. The side walls 10 of each gage are formed with horizontally disposed slots 21 to permit the passage of transverse clamping bolts 22, said bolts being provided with wing nuts 23 so that by placing the gage on either working face of the rule with the arms 10 thereof embracing the plates 6, and adjusting the wing nuts 23, said gage may be firmly clamped in position on the rule. It will here be noted that the bolts 22, by engagement with either working face of the plumb rule, serve to limit the inward movement of the gage, while the clamping bolts or screws 20, by engagement with the bolts 22, serve to regulate the adjustment of the gages on the rule, thus to permit the plate 11 and ears 14 to project in front of or at the rear of the longitudinal edges or working faces 7, or in vertical alinement therewith, as the case may be.

Slidably mounted on one side of each gage 9, between the spaced ears 14, is a trigging attachment, preferably in the form of a flat plate 24 having spaced slots 25 therein for the reception of bolts or similar fastening devices 26, the latter being extended through one of the walls of the gage and the adjacent slots 25 for the purpose of clamping the plate 24 in adjusted position. One end of each plate 24 is provided with a vertically disposed ear 27 having a rearwardly extending lip 28, spaced from the body of the plate to form a recess for the horizontal line 13 when it is desired to form a wall or partition with an offset or sinking. The opposite end of the plate 24 is formed with a longitudinally disposed finger 29 and a forwardly extending hook 30 adapted to support a profile line 31, or an ordinary line when trigging vertically. Thus it will be seen that by loosening the bolts 26 and sliding the plate 24 longitudinally on the adjacent gage to the position shown in Fig. 3 of the drawings and passing the line 13 beneath the lip 28, said line may be supported in spaced relation to the face of the wall and held in said position when forming an offset or sinking. By detaching the plate 24 and replacing the latter in reverse position with the hook 30 extending between the ears 14, said hook may be used for supporting a vertical or profile line, as best shown in Fig. 2 of the drawings.

The plumb rule is supported on the exterior or interior face of a wall by means of brackets 32, similar in construction to the brackets shown in my pending application above referred to, there being vertical slots 33 formed in the body portion 5 and side plates 6 of the rule to permit the passage of transverse bolts 33'. When the brackets 32 are secured to a new wall, suitable plates 34 are embedded in the mortar between the bricks of some of the courses and projected through slots 35 formed in the adjacent attaching arms of said brackets to permit the insertion of wedges 36.

When the plumb rule is used on an old or finished wall, the brackets are preferably retained in position thereon by means of substantially U-shaped clips 37 having their intermediate portions offset at 38 to form spaced horizontally disposed clamping fingers 39, the latter being inserted between the adjacent bricks in a course by removing a portion of the mortar therebetween. The clips 37 are pierced by vertically disposed clamping bolts 40 so that by adjusting the wing nuts 41, the lips 39 may be securely clamped in engagement with the adjacent brick. The clips 37 are also provided with laterally extending bolts 42 which project through slots 43 formed in the adjacent supporting brackets, thus to retain said brackets in position on a wall, as best shown in Fig. 10 of the drawings.

In some cases, auxiliary brackets 44 of the construction shown in Fig. 8, are employed to assist in retaining the plumb rule in position on a wall. The auxiliary bracket 44 is adapted to embrace one working face of the rule and is provided with a transverse bolt 45 and an adjusting bolt 46, similar in construction to the bolts 22 and 20 shown in Fig. 5 of the drawings, for the purpose of clamping the auxiliary bracket in position on the plumb rule. One leg of the auxiliary bracket is provided with an angularly disposed arm 47 adapted to bear against the adjacent exterior face of the wall or partition and to which it is secured by one or more wedges 48, similar in construction to the wedges 36.

If desired, some of the sliding gages may be formed without the trigging attachment or plate 24, as best shown in Fig. 9 of the drawings, in which case, the ears 14 will extend uninterruptedly, practically the entire height of the gage, as indicated at 49.

In constructing a wall, one of the plumb rules is supported on the exterior face of the wall at each corner thereof by means of the brackets 32, as best shown in Fig. 1 of the drawings. The upper gages 9 are then adjusted vertically of the rules to the desired height and the horizontal line 13 extended between the rules with its opposite ends seated in the slots 17 of the adjacent vertical ears 14 so as to permit the bricklayer to build to said line. With the plumb rules in the position shown in Fig. 1 of the drawings, the longitudinal edges 7 bear against the adjacent exterior face of the wall so as to form an accurate vertical gage or guide for the succeeding courses of a wall. If desired, one of the plumb rules may be positioned at each corner of the wall, in which event one end of the line 13 on one side of the wall will be passed under the lips 16 of the adjacent gage to form a right angle, as best shown in Fig. 7 of the drawings. In order to form an offset or sinking in the wall, the trigging attachment or plate 24 is moved to the position shown in Fig. 3 of the drawings, and in order to support a vertical or profile line, the plate 24 is reversed and placed on the adjacent gage in the manner shown in Fig. 2 of the drawings.

When using the plumb rule in the formation of an interior angle, the brackets 32 are supported on the inner face of the wall and the plumb rule inserted in the brackets in the manner before stated. With the plumb rule supported on the inner face of the wall, the angular plate 11 forms an accurate gage for the bricklayer to build to, as best shown in Fig. 4 of the drawings.

It will be noted that when the rule is used in the manner shown in Fig. 4, the notches 12 receive and house the line 13 so as to prevent said line from rubbing against the bricks during the erection of the wall and cutting or otherwise injuring the line.

The plumb rule is preferably provided with a laterally extending bracket 50 from which is suspended a plumb bob 51 of the ordinary construction.

It will of course be understood that the arms of the brackets 32 may be adjusted at any angle or inclination to each other so as to permit said brackets to be used on either an interior or exterior angle of any shape.

Particular attention is here directed to the fact that by making the sliding gages in the manner described, said gages may be readily placed in position on either working face of the plumb rule and adjusted vertically of the latter, the arms of said gages being clamped in engagement with the side walls of the rule so as to prevent accidental displacement thereof, in the manner before described.

From the foregoing description, it is thought that the construction and operation of the device will be readily understood by those skilled in the art and further description thereof is deemed unnecessary.

Having thus described the invention, what is claimed as new is:

1. A plumb rule including a body portion having a working face provided with a longitudinally disposed mortar receiving groove, and a gage slidably mounted on the body portion and bearing against the side walls thereof.

2. A plumb rule including a body portion having oppositely disposed working faces, each provided with a motar receiving groove, and a reversible gage slidably mounted on the body portion and bearing against the side walls of said body portion.

3. A plumb rule including a body portion having its opposite longitudinal edges provided with mortar receiving grooves, a gage slidably mounted on the body portion and provided with means for supporting a line, and means for holding the gage in different positions of adjustment.

4. A plumb rule including a body portion having flat plates secured to the opposite sides thereof, the longitudinal edges of the plates being extended laterally beyond the adjacent edges of the body portion to form mortar receiving grooves, and a detachable gage slidably mounted on the body portion and provided with means for supporting a line.

5. A plumb rule including a body portion having oppositely disposed working faces provided with mortar-receiving grooves, a gage slidably mounted on the rule, and a trigging attachment slidably mounted on the gage and having means at one end thereof for engagement with a vertical profile line, and means at its other end for engagement with a horizontal line.

6. A plumb rule including a body portion having oppositely disposed mortar receiving grooves, a gage slidably mounted for vertical movement on the body portion and provided with spaced ears for engagement with a horizontal line, and a trigging attachment slidably mounted on the gage between said ears.

7. A plumb rule including a body portion, a gage slidably mounted on the body portion, and a plate slidably mounted on the gage and having one end thereof provided with a hook for engagement with a vertical profile line and its other end provided with means for supporting a horizontal line.

8. A plumb rule including a body portion, a gage slidably mounted on the body portion, a reversible plate carried by the gage and having a slot formed therein, one end of said plate being provided with a hook for engagement with a vertical profile line and the other end thereof provided with a terminal ear for engagement with a horizontal line, and fastening devices carried by the gage and extending through the slot in the plate for clamping said plate in position on the gage.

9. A plumb rule including a body portion, a substantially U-shaped gage slidably mounted on the body portion and having one arm thereof bent laterally to form an angularly disposed plate and its other arm provided with spaced vertically alined ears, means piercing the arms of the gage for clamping the latter in adjusted position on the rule, and a plate slidably mounted on the gage between said ears and having one end thereof provided with means for engagement with a vertical line and its other end provided with means for engagement with a horizontal line.

10. A plumb rule including a body portion, a substantially U-shaped gage slidably mounted on the body portion and provided with oppositely disposed spring arms bearing against the side walls of the rule, said arms being formed with longitudinal slots, bolts extending through said slots for engagement with one longitudinal edge of the rule, and clamping devices piercing the gage and bearing against the bolts.

11. A plumb rule including a body portion, a substantially U-shaped gage slidably mounted on the body portion and including spaced arms, one of which is bent laterally to form an angularly disposed plate and the other provided with spaced laterally extending vertically alined fingers, a reinforcing plate bearing against the closed end of the gage, transverse bolts piercing the arms of the gage, and longitudinal bolts piercing the end wall of the gage and said reinforcing plate for engagement with the transverse bolts.

12. A plumb rule including a body portion having oppositely disposed working faces, each provided with a mortar receiving groove, a reversible gage slidably mounted on the body portion and formed of a single piece of metal bent into substantially U-shape to produce spaced arms bearing against the side walls of the body portion, one of said arms being provided with an angularly disposed plate having notches formed therein for the reception of a line and the other arm of the gage being provided with spaced vertically alined ears having rearwardly extending lips also for engagement with a line, there being longitudinal slots formed in the arms of the gage, transverse bolts seated in said slots, clamping devices extending through the gage and bearing against the transverse bolts for forcing the latter against the adjacent working face of the gage, and a plate slidably mounted between the spaced ears of said gage and having one end thereof provided with means for engagement with a vertical line and its other end provided with means for supporting a horizontal line.

13. The combination with a bracket for attachment to a wall, of a plumb rule supported in said bracket and having a longitudinal slot formed in one end thereof, a fastening device extending through the bracket and engaging the adjacent wall of the slot, a reversible gage slidably mounted on the plumb rule, and a plate slidably mounted on the gage and having one end thereof provided with means for supporting a horizontal line and its other end provided with means for engagement with a vertical line.

14. The combination with a plurality of brackets for attachment to a wall, of a plumb rule supported in said brackets and having a slot formed in one end thereof and extending vertically for a portion of the height of the rule, fastening devices extending through the bracket and slot in the rule, a gage slidably mounted for vertical movement on the rule and provided with spaced arms bearing against the side walls of the rule, means for clamping the gage in different positions of adjustment on the rule, and a trigging attachment slidably mounted on the gage and movable to operative position beyond one working face of said rule.

15. The combination with a bracket for attachment to a wall, of a plumb rule seated in said bracket and including a body portion having oppositely disposed flat plates secured thereto and provided with terminal working faces spaced apart to form intermediate mortar receiving grooves, a detachable gage slidably mounted on the rule and bearing against the side walls thereof, a trigging attachment carried by the gage, an auxiliary bracket embracing the rule for attachment to a wall, means for clamping the auxiliary bracket in position on said rule, and means for holding the gage in different positions of adjustment.

In testimony whereof, I affix my signature in presence of two witnesses.

HENRY PLATT. [L. S.]

Witnesses:
    MAY B. WARD,
    EVELYN E. HALDEMAN.

Copies of this patent may be obtained for five cents each, by addressing the "Commissioner of Patents, Washington, D. C."